April 6, 1971     A. D. ROSE     3,574,024
METHOD OF BONDING A WINDOW TO THE WINDOW OPENING IN A VEHICLE
Filed Feb. 4, 1969     2 Sheets-Sheet 1

Inventor
Alan D. Rose
By
Stevens, Davis, Miller & Mosher     Attorneys

April 6, 1971     A. D. ROSE     3,574,024
METHOD OF BONDING A WINDOW TO THE WINDOW OPENING IN A VEHICLE
Filed Feb. 4, 1969     2 Sheets-Sheet 2
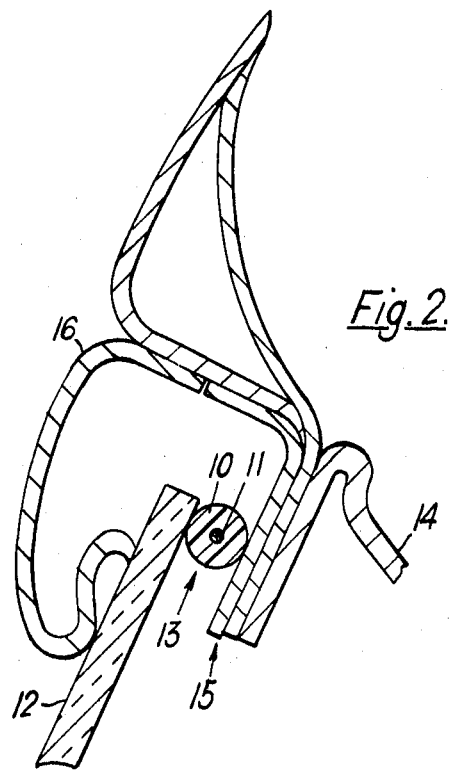
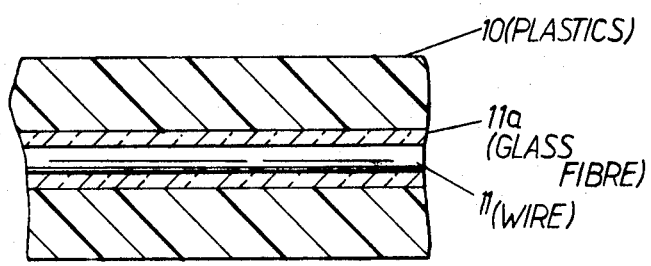
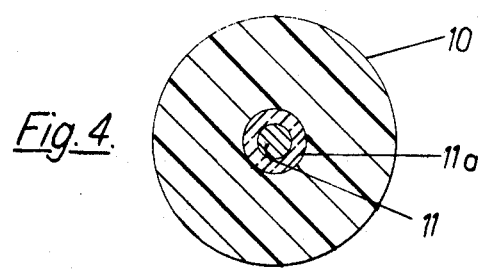
Inventor
Alan D. Rose

United States Patent Office 3,574,024
Patented Apr. 6, 1971

3,574,024
METHOD OF BONDING A WINDOW TO THE WINDOW OPENING IN A VEHICLE
Alan D. Rose, Oadby, England, assignor to Bitumen Industries Limited, Slough, Buckinghamshire, England
Continuation-in-part of application Ser. No. 531,599, Mar. 3, 1966, which is a continuation-in-part of application Ser. No. 359,097, Apr. 13, 1964. This application Feb. 4, 1969, Ser. No. 796,447
Int. Cl. B60j 1/02
U.S. Cl. 156—108       10 Claims

ABSTRACT OF THE DISCLOSURE

This invention relates to a method and means for bonding windows into automobile bodies. A bonding strip comprising a curable synthetic polymeric material having an electrical conductor running therethrough is used.

Figure 1:
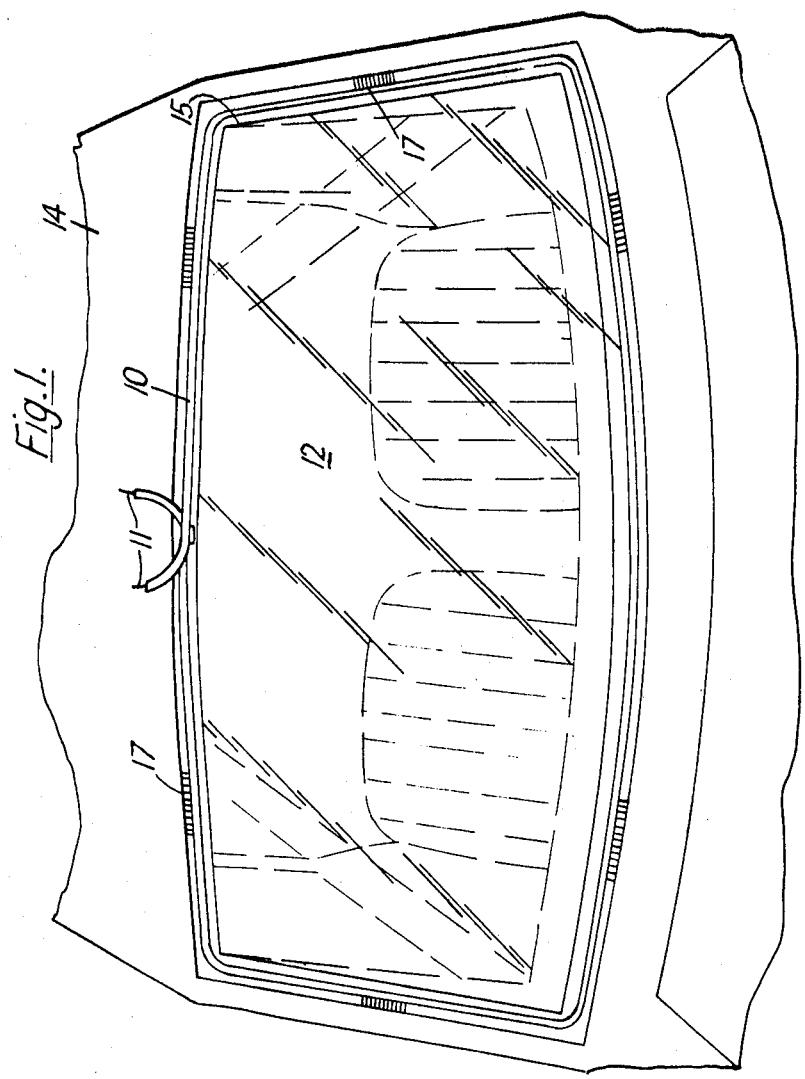

This application is a continuation-in-part of my application, Ser. No. 531,599 filed Mar. 3, 1966 which is a continuation-in-part of my application Ser. No. 359,097 filed Apr. 13, 1964, both of which are now abandoned.

This invention relates to a method of and means for glazing or bonding windshields or other transparent windows (hereinafter referred to as windows) to apertures in the bodies of vehicles such as motor vehicles or parts thereof and the term bonding is used herein to describe such glazing.

In the case of a motor vehicle it has been proposed to secure the windshield or rear window in the vehicle by applying a preformed molded section of elastically deformable material such as rubber to the boundary of a sheet of glass, and positioning the sheet in the aperture in the frame for the windshield or window. The molded section customarily used is relatively expensive, and there is difficulty sometimes in accurately positioning the sheet of glass in the frame. When glass is inserted, it is often damaged during fitting owing to this difficulty particularly when laminated glass is used, and, also, sealing in a waterproof fashion is difficult to obtain, particularly when toughened glass is used, owing to the wide tolerances required in the manufacture of toughened glass and the apertures in vehicles.

It has also been proposed to extrude a mixture of polysulphide rubber and curing agents onto the boundary of a sheet of glass which is then pressed home into an aperture in the frame of a motor vehicle for a windshield or rear window; the rubber cures and secures the sheet is position in said aperture. When the polysulphide rubber mixture is used, difficulties are encountered owing to the short pot life and working time of the mixture. The equipment for metering and mixing the rubber and the curing agents is expensive and complicated. The mixture is dirty to use and causes considerable expenditure on cleaning up processes.

A primary object of the present invention is to provide for bonding a window in a vehicle body in a relatively inexpensive, simple manner with minimal wastage of materials and to do so without restriction in available working time and to provide a bonding which is watertight and has sufficient resilience to withstand the stresses encountered when the vehicle is in use even at low temperatures.

The invention provides a method of securing a window in a vehicle body designed so that peripheral surface portions of the window may overlie flange portions of the body which surround an aperture in the body. Initially, there is placed either on the peripheral surface portions of the window parallel to the edge of the window, or on the flange portions of the body, a strip of tacky, deformable essentially non-resilient material which is heat curable to a resilient state and comprises synthetic polymeric material curable to an elastomeric state having a resistive conductor of electricity extending lengthwise through it. The window is then located with its peripheral surface portions overlying the flange portions and pressure is exerted to squeeze the strip between the peripheral portions of the window and the flange portions whilst the strip is soft so that the strip is deformed and fills the gap between the window and the flange portions. The conductor is connected with a source of electricity and an electric current is passed along the conductor to heat the conductor whereby to cause curing of the material of the strip to a resilient state in which it forms a tough resilient and waterproof bond between the window and the flange.

Preferably, the material of the strip is slightly adhesive in order to assist in its ready application to the window or part or frame. The degree of softness can vary but it is preferably such that the pressure exerted to deform the strip is only light for example, that achieved by light hand pressure.

In some instances it may be desirable to apply a primer to each of the window and flange prior to placement of the strip and location of the window. While this application of primer is not an essential step in the method, use of a suitable primer generally results in very high bond strengths being obtained between the strip and the window on the one hand, and the strip and the flange or flange portions on the other, thus providing the vehicle with a desirable safety feature. A solution of A1020 silane (supplied by Union Carbide) black finishing grade paint based on high viscosity chlorinated rubber, phenolic resin and epoxidized oil has been found particularly effective as a primer for application to painted steel flanges and a solution of Y4310 Silicone (supplied by Union Carbide) has been found particularly effective as a primer for application to glass windows.

Preferably the strip is stored on a reel, and, it is also preferable, prior to being placed on the window or flange the strip is heated, for example, by passing electric current along the wire, to remove any crystallization which may have occurred in the strip.

When the strip is placed on the window or flange, it is preferred to have it extend entirely around the aperture and have opposed end portions crossed over each other prior to passage of the electric current.

Strips which may be used in a method according to the invention are those which are heat curable to a resilient state and which in their uncured state have sufficient surface tackiness to remain in allotted position while the window is located and sufficient softness to allow bedding of the strip by light pressure as above referred to, together with absence of recovery when the light pressure is removed, and that after heating display strong adhesion to the window and flange while developing sufficient resilience to withstand vibrations of the window and flange when the vehicle is used.

The preferred material for use in the strip comprises basically a curable polymeric material, more specifically a curable elastomer, which in its uncured state melts to a pourable fluid when heated to a temperature of not more than 60° C. Suitable polymers for use include various elastomers, or curable elastomers, such as butadiene-acrylonitrile copolymers and chloroprene polymers, for example, those known as neoprene FB and neoprene FC each of which is a stabilized low molecular weight chloroprene polymer. Neoprene FB crystallizes at a medium rate and neoprene FC crystallizes at a fast rate, and each has a specific gravity of 1.23 at 25° C. Both these materials are low viscosity polymers which are soft, crystalline solids at room temperature. They have non-shrink and non-slump properties. We prefer to employ neoprene FB and to use this polymeric material in quantities greater than about 40% by weight of the material of the strip, more preferably in quantities of about 40% to 45% by weight of the material of the strip. The quantity of the polymeric material which is used may be reduced if the material of the strip also comprises a harder curable polymeric material, for example, neoprene AC, but this is often undesirable because a material may be produced which is too hard for convenient use. If more than about 60% of the low molecular weight polymer is used the material of the strip may be too soft for convenient use.

The material of the strip preferably includes a phenolic resin which imparts tackiness to the material of the strip when in its uncured state and reinforces the material of the strip when the material is cured. In the preferred manner, the phenolic resin is liquid in its uncured state and is of the resole type being curable when heated in the presence of hexamine. Suitable liquid phenolic resins include those known as Cellobond H832, Bakelite 14634 and Durez 11078; preferably Cellobond H832 is employed which is a liquid cashew phenolic resin having a specific gravity of 0.93. Preferably the liquid phenolic resin is present in the material to an extent of not more than about 7.5 parts by weight per hundred parts by weight of the synthetic polymer present, larger quantities giving materials which tend to cure too quickly for convenient use after more than short storage periods.

The material of the strip preferably includes finely divided filler material. The quantity of filler material used depends on the characteristics of the filler, the type and quantity of the polymeric material used and the properties required of the strip; preferably the finely divided filler material comprises a mixture of carbon black, china clay, and asbestos fiber, in a ratio by weight of 2:7:2 in sufficient quantity to provide 70% to 75% by weight per 100 parts by weight of the synthetic polymer present. Preferably the material of the strip includes curing and vulcanizing agents, for example, canary litharge and hexamine. The material of the strip may also include plasticizer material, for example, non-degraded heat-softened buna rubber, dioctyl sebacate, Factice, heavy petroleum distillate or chlorinated wax.

The invention provides a glazing strip for motor vehicle windows comprising an elongated body or strip of heat curable material having a surface that is adhesive enough to stick temporarily to a window during assembly, and a resistive electrical conductor embedded in said body so as to extend lengthwise through it. The heat curable material is capable of change between a soft and deformable uncured state (in which it is soft enough to allow a window to be bedded into its frame, with the strip between them, by light pressure) and a resilient cured state and is further capable of bonding to a window and frame when heated and cured. The conductor in turn is such as (when the ends of a length of strip such as to surround a window are connected to a suitable electric supply) to generate the heat needed to effect such bonding and to cause change from uncured to cured state of the material of the strip.

The strip can have any desired cross-section, but we prefer to employ a strip of uniform circular cross section because this reduces to a minimum the possibility of trapping air between the window and the surface of the strip and between the flange and the surface of the strip.

The resistive conductor preferably takes the form of a wire extending axially of the strip. Ends of the wire may be exposed to facilitate electrical contact with an external source of current supply.

Under certain conditions, e.g. where the material of the strip is, before use, very soft and where the strip is liable to be subjected to rough handling, there may be a risk of the conductor wire in the strip becoming exposed and when used may contact a metallic body so as to cause a short-circuit. In order to avoid or minimize this risk the strip may be provided with a resistive conductor in the form of a wire covered by a flexible protective sheath of electrically insulating material. The sheath must, of course, be made of material such that it retains its necessary electrically insulating and mechanical properties when subjected to heat from the wire. To minimize its resistance to passage of heat from the wire to the material of the strip, the sheath will normally be made as thin as possible while retaining the necessary mechanical strength. The sheath, may, for example, comprise an enamel coating on the wire or a sleeve of woven fabric. Preferably the sheath comprises a resin-bonded glass fiber sleeve.

Heating of the strip as a result of passing electric current along the resistive conductor of electricity along the strip gives rise to a number of important advantages. Initial heating softens the strip and facilitates correct bedding of the window; it is possible to arrange that the strip be heated to an extent sufficient to initiate its cure without subjecting the car body or the window to appreciable heating; the center part of the strip (which is the last part of the strip which would be cured as a result of external heating) is cured first and it is possible to cure the strip without difficulty when required that is, in a point in time, thus enabling a simple arrangement in the production line to be employed.

The extent of heating of the strip which is required varies to some extent in accordance with the choice of material of the strip. With the indicated preferred materials of the strip it is usually only necessary to apply sufficient heat to the strip to initiate curing thereof, to effect curing of the material of the strip to a cured state in which the strip is in a resilient state in which it forms a tough resilient and waterproof bond between the window and the flange which is sufficiently strong to enable the vehicle to be driven from the production line. With the preferred materials, further curing of the material occurs over a period of days after the heating has been carried out, and the strength of the bond between the window and flange increases; completion of the cure occurring gradually over a period of days after the heating.

Embodiments of the invention are now described by way of example only in connection with the fitting of a windshield to a motor vehicle and with reference to the accompanying drawings in which:

FIG. 1 is a front elevation of the windshield;
FIG. 2 is a cross-section of part of the windshield drawn to a larger scale than FIG. 1;
FIG. 3 is a longitudinal section of a modified piece of strip according to the invention; and
FIG. 4 is a cross-section of the strip of FIG. 3.

A heat curable material consisting of—

| Material: | Parts by wt. |
|---|---|
| A low molecular weight chloroprene polymer (neoprene FB) | 75 |
| An aldehyde amine accelerator (Du Pont accelerator 808) | 1.5 |
| An antioxidant (octamine) | 1.0 |
| Liquid cashew phenolic resin (Cellobond H832) | 10 |
| Hexamine | 2 |
| Benzoic acid | 0.5 |
| Non-degraded heat-softened buna rubber | 20 |
| Canary litharge | 20 |
| Carbon black | 10 |
| China clay | 35 |
| Asbestos fiber | 10 | is first mixed in a cooled heavy duty mixer and is then extruded onto 0.020 inch oxidized Eureka wire to form a strip 10 with the wire 11 as a core, as shown in FIGS. 1 and 2. The material of the strip is soft, tacky, deformable and non-resilient at this time, and the strip 10 is preformed of the necessary length to extend around a motor vehicle window of given dimensions, the material at the ends of the strip being removed to expose the ends of said wire.

A primer solution A was made up according to the following formulation.

Material: Parts by wt.
  Silicone Y4310 solution (a 5% solids solution of silicone material supplied by Union Carbide) _ 50
  Toluene _____ 40
  n-Butanol _____ 5
  Butyl Cellosolve _____ 5

Primer solution A is applied with a brush to peripheral surface portions of a windshield 12 and allowed to dry.

A primer solution B was made up according to the following formulation:

Material: Parts by wt.
  Black finishing grade paint based on high viscosity chlorinated rubber (34% solids) ____ 255
  Acetone _____ 309
  Phenolic resin, e.g. Bakelite Resin 14634 _____ 144
  Silane, e.g. A1020 supplied by Union Carbide _ 21.6
  Epoxidized soy bean oil.

Primer solution B was applied with a brush to the boundary 15 of an aperture 13 in a vehicle body, and allowed to dry.

The strip 10 is stored on a reel in a refrigerated cabinet maintained at about 14° F. Immediately before removal from its reel the ends of the strip are connected with a source of electricity and a current passed at 2 volts per lineal foot for about 30 secs. to preheat the strip. After the preheating step the strip is applied to the peripheral surface portions of the windshield parallel to the edge of the windshield 12 which is then located in the aperture 13 for the windshield 12 in the vehicle frame 14, with said strip 10 abutting against the boundary 15 of the aperture 13. The ends of the strip 10 are crossed over one another as shown in FIG. 1 but are separated by a leaf insulator 18 to prevent shorting during passage of an electric current through the wire 11. The ends of the wire 11 are then connected to a source of electricity at 2 volts per lineal foot for about 6½ minutes. The strip is allowed to soften for the first 1½ minutes passage of the current, and then the windshield is pressed into position by light hand pressure, so as to squeeze the strip between the glass and the flange and deform it into conformity with the surface configuration of the glass and flange. During the last 5 minutes passage of the current, the wire heats the strip sufficiently to cause cure of the material of the strip to a resilient state so as to bond the screen firmly to the metal, and provide a watertight seal between the glass and the metal, having sufficient resilience to withstand the stresses encountered when the vehicle is in use. The crossed-over ends of the strip 10 are then either cut off or are inserted into the molding 16 which is applied after bonding. During the days immediately after passage of the electric current through the wire curing of the material of the strip continues until after a few days the cure is considered complete.

If desired, spacers 17 of, for example, rubber or magnetized material may be located around the aperture 13 to retain the windshield 12 in position in the frame 14 during the location of the windshield and passage of the electric current. The spacers 17 may subsequently be left in position or removed.

An advantage of the invention is that the sealing strip is easy to handle, may be used on a mass production basis, does not involve mixing at the site of the vehicle, or require expensive mixing and metering equipment, is easily stored and may be used for the method of the invention in relatively simple manner, resulting in a saving in the cost of sealing windshields in motor vehicles.

Where it is necessary to remove a broken windshield the resistance wire may, if sufficiently strong, be used as a cutter to cut half of the circumference of the strip in the manner of a cheese cutter.

FIGS. 3 and 4 show a modified form of strip 10. In making this modified strip, a material of the same composition as used for the strip hereinbefore described with reference to FIGS. 1 and 2 is as before mixed in a cooled heavy duty mixer and is then extruded onto a wire 11 covered by a resin-bonded glass-fiber sheath 11a to form a strip 10 of about 5/16 inch diameter with the sheathed wire as a core. The wire may suitably be made of a 90% copper 10% nickel alloy and have a diameter of 0.024 inch (23 S.W.O.), a specific gravity of 8.95, a nominal resistivity of 14.1 microhm centimeters, a resistance of 0.440 ohm per yard and melting point of 1100° C. The strip 10 is preformed of the necessary length to extend around a motor vehicle window of given dimensions, the material and sheath at the ends of the strip being removed to expose the ends of said wire.

The strip is packaged on a round plastics reel to facilitate easy usage. Just before use, before the strip is removed from the reel, the ends of the strip are connected with a source of electricity and a current passed at 2 volts per linear foot for about 30 seconds to preheat the strip.

After ensuring that the peripheral surface portions of the windshield 12 and of the painted metal aperture 13 for the windshield in the vehicle frame 14 are clean, a thin coat of primer solution A is applied to the peripheral surface portions of the windshield and a thin coat of primer solution B is applied to the frame either by a brush or by a felt pad which gauges the width of the primer application. The primer dries within one minute. The strip 10 is then placed upon the peripheral surface portions of the windshield 12 and, owing to the fact that the strip has a tacky or sticky surface, adheres thereto. The strip is arranged to extend all the way round the margin of the windshield and the two ends of the strip are crossed over. The windshield 12 is then lifted by means of two rubber sucker grip holders affixed thereto and placed into the aperture 13. It is held in place at this stage solely by resting the windshield on the margin 15 of the aperture or, if desired, on rubber spacers 17 which hold the windshield centrally in position. The two ends of the wire 11 are then connected to a low voltage source of electricity, usually of the order of two volts per lineal foot of strip. Upon switching on the current supply the strip quickly heats and softens (in about 1 minute). After softening, the windshield is readily bedded into the aperture by hand pressure, thus squeezing the strip between the margin of the windshield and the aperture margin 13 (which latter is constituted by the pinch weld flange of the aperture), so as to deform the strip and effect a bond. After a further five minutes of heating, the electrical input is switched off, since the heat has initiated a curing process within the strip and the strength of adhesion is sufficient to allow the vehicle to be driven on the road. The margin of the windshield, which shows the strip, is then covered by the reveal molding 16 which is fixed into clips so that the joint or bond is not visible. The crossed-over ends of the strip are either cut off before inserting the reveal molding or concealed behind the molding. Cure of the material of the strip continues during the ensuing days while the vehicle is subject to ambient temperature conditions and the material is thus permanently cured to a resilient state and bonds the windshield firmly to the aperture margin, providing also a watertight seal between the windshield and the aperture margin, and having sufficient resilience to withstand the stresses encountered when the vehicle is in use.

Having thus described my invention, what I claim as new and desire to secure by Letters Patent of the United States is:

1. A method of securing a window in a vehicle body so that peripheral face surface portions of the window may overlie flange portions defining an aperture in the vehicle body, which comprises:
  (a) positioning the window in the aperture in the vehicle body with a strip of initially tacky deformable, essentially non-resilient material in effectively interposed relationship between a peripheral face surface portion of the window and the flange portion of the body, the material of said strip being heat curable to a resilient state and comprising synthetic polymeric material curable to an elastomeric state, the said strip having a resistive conductor of electricity extending therethrough, and, while essentially maintaining said positioning, (b) applying pressure to squeeze the strip between the peripheral face surface portions of the window and the flange portions whereby the strip is deformed and fills in therebetween, and (c) passing an electric current along the conductor to heat the conductor causing curing of the material of the strip to a resilient state in which it forms a tough, resilient and waterproof bond between the window and the flange.

2. A method according to claim 1 wherein the material of the strip comprises a synthetic polymeric material which in its cured state is elastomeric and which in its uncured state melts to a pourable fluid when heated to a temperature of not more than 60° C.

3. A method according to claim 2 wherein the synthetic polymeric material is a stabilized low molecular weight chloroprene polymer.

4. A method according to claim 3 wherein the synthetic polymeric material provides greater than about 40% by weight of the material of the strip.

5. A method according to claim 2 wherein the material of the strip includes a phenolic resin which is liquid in its uncured state.

6. A method according to claim 5 wherein the phenolic resin is present in the material to an extent of up to about 7.5 parts by weight per hundred parts by weight of synthetic polymeric material.

7. A method according to claim 2 wherein the material of the strip includes a plasticizer.

8. A method according to claim 7 wherein the plasticizers is non-degraded heat softened butadiene rubber.

9. A method according to claim 1 wherein the strip extends entirely around the aperture, and end portions of the strip are crossed over each other prior to passage of the electric current.

10. A method according to claim 1 wherein prior to placement of the window a primer solution is applied to the flange and allowed to dry.

References Cited
UNITED STATES PATENTS

| | | | |
|---|---|---|---|
| 3,155,204 | 11/1964 | Campbell et al. | 156—295X |
| 3,241,277 | 3/1966 | Coppock | 156—295X |
| 2,633,443 | 3/1953 | Langer | 156—275 |
| 2,662,045 | 12/1953 | Baggott | 156—275 |
| 2,952,578 | 9/1960 | Carlson | 156—275 |
| 3,047,703 | 7/1962 | Asre | 156—275 |

CARL D. QUARFORTH, Primary Examiner

S. J. LECHERT, JR., Assistant Examiner

U.S. Cl. X.R.

156—275, 291, 295, 327, 333, 334